J. MONSON.
VEHICLE TIRE.
APPLICATION FILED MAR. 15, 1912. RENEWED FEB. 23, 1915.
1,177,350.
Patented Mar. 28, 1916.
3 SHEETS—SHEET 1.
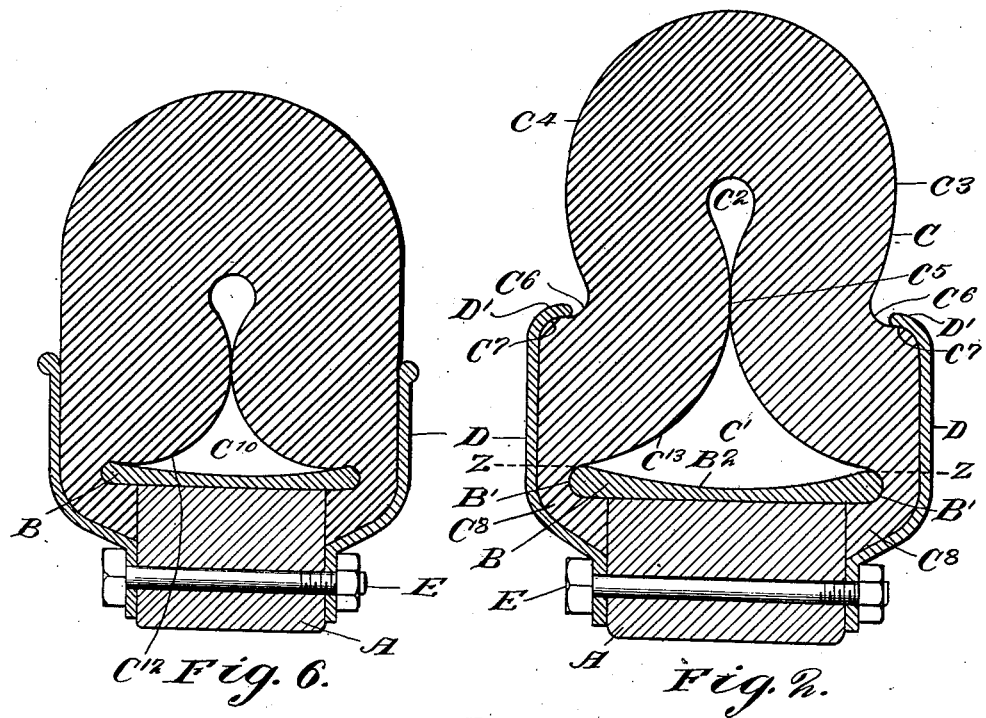
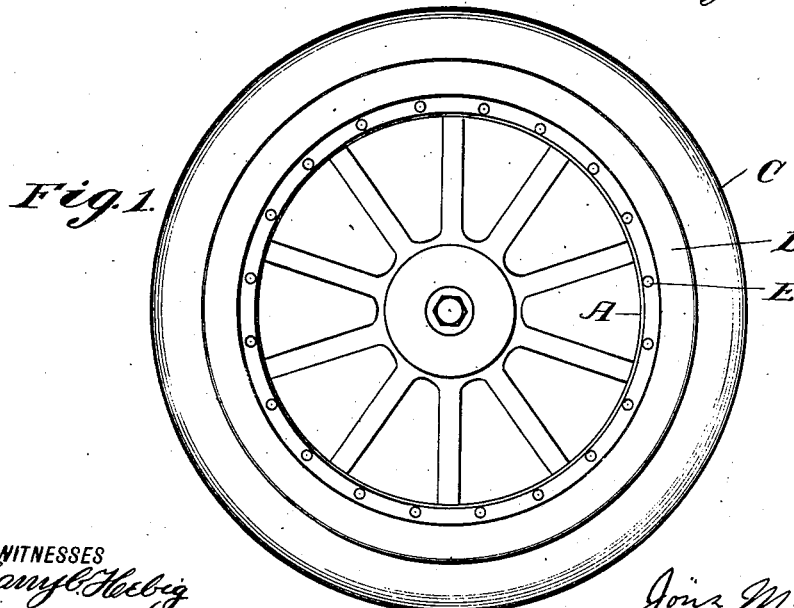

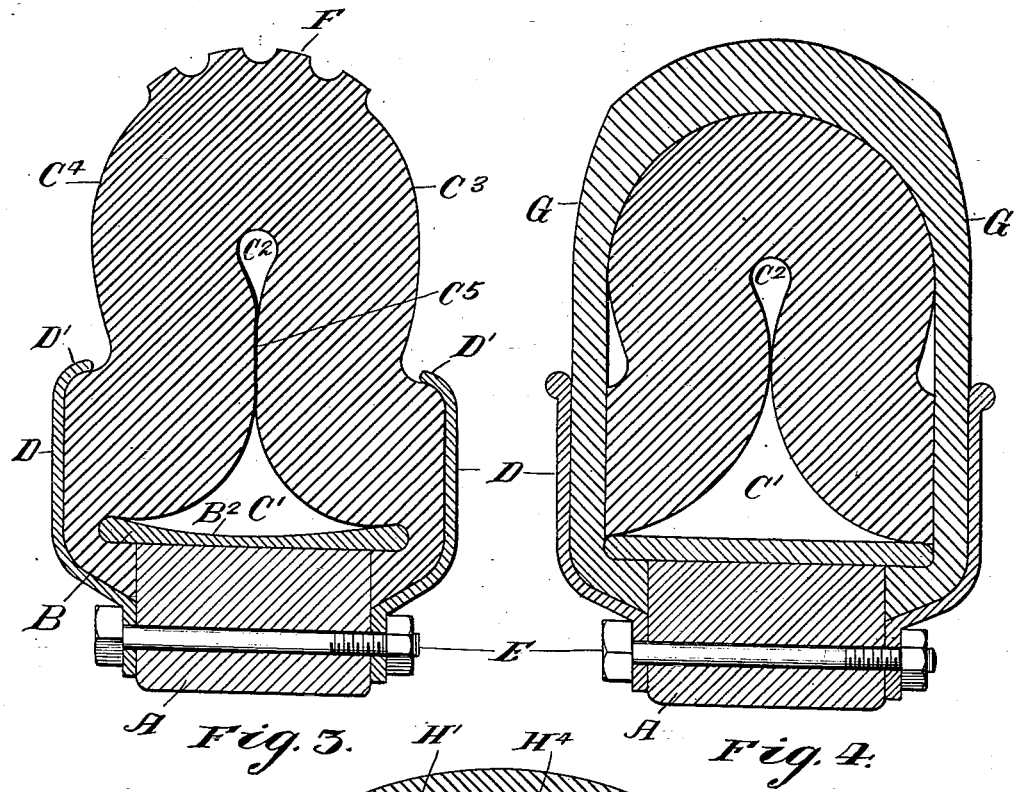
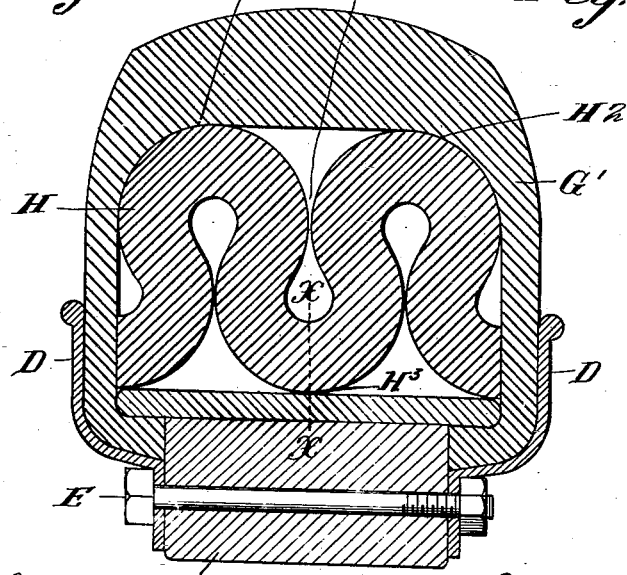

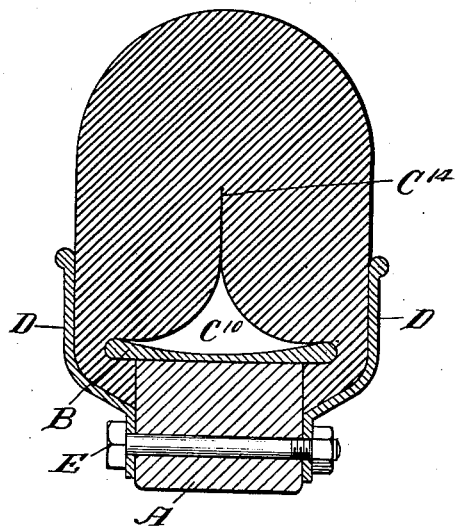
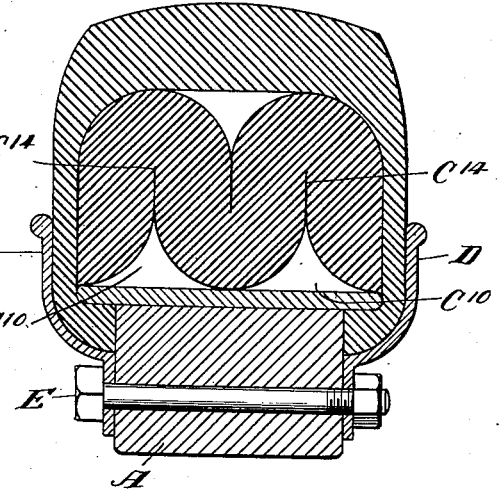

UNITED STATES PATENT OFFICE.

JÖNS MONSON, OF NEW YORK, N. Y.

VEHICLE-TIRE.

1,177,350.

Specification of Letters Patent. Patented Mar. 28, 1916.

Application filed March 15, 1912, Serial No. 683,937. Renewed February 23, 1915. Serial No. 10,123.

*To all whom it may concern:*

Be it known that I, Jöns Monson, a subject of the King of Sweden, and a resident of New York city, in the county of New York and State of New York, have invented certain new and useful Improvements in Vehicle-Tires, of which the following is a specification.

My invention relates to vehicle tires and the object of my invention is to provide an improved tire for vehicles that is more easily made, cheap to construct, resilient and durable.

A further object is to provide a non-pneumatic tire which offers a gradually increasing resistance to stress exerted upon it.

A further object is to provide a tire and wheel construction comprising means for fastening the tire to the felly of the wheel.

The novel features of construction will be set forth in the claims.

Referring to the drawings which form a part of this specification Figure 1 is a side elevational view of a wheel and tire embodying my invention. Fig. 2 is a cross sectional view of a tire and wheel felly, disclosing one form of cross section, the folds of the rubber being practically of even thickness. Fig. 3 is a similar view showing a tread surface of the non-skid type and modified form of construction. Fig. 4 is a cross sectional view of a form in which a shoe is used in combination with the form as shown in Fig. 2, from the dotted lines upward. Fig. 5 is a cross sectional view of a tire comprising a plurality of folds, each fold of which presents a tread surface to the inner tread surface of the shoe, or if used without the shoe, presents said surface direct to the roadway. Fig. 6 is a cross sectional view of a tire of modified construction and adapted to carry heavier loads than that disclosed in Fig. 2. Fig. 7 is a cross sectional view of a form similar to that shown in Fig. 6, but having a single annular chamber formed therein. Fig. 8 is a cross sectional view of a modified form of that shown in Figs. 6 and 7. Fig. 9 is a cross sectional view of a modified construction to that disclosed in Fig. 5.

Referring to Figs. 1, 2 and 3, A, indicates the felly of a wheel on which is mounted an iron or other suitable inelastic band, B, the outer edges B' of which are rounded over to present a smooth surface, and the middle portion of which is preferably curved as illustrated at $B^2$. C, indicates the tire which is made of rubber or other suitable yielding material. When made of rubber, the tire is made by a mold in the usual manner, the spaces C' and $C^2$ being formed by inserting a core in the mold which is made very thin at the point where the sides $C^3$ and $C^4$ are shown to abut at $C^5$ in order to support the core portion which forms the space $C^2$. The spaces $C^2$ and C' extend entirely around the circumference of the tire and the sections $C^3$ and $C^4$ are held in abutting relation at $C^5$ by the flanges D.

The walls of the tire are preferably formed of equal thickness down to the felly, as shown in Fig. 2, but not necessarily so. The curving of the side walls inward and then outward as shown at $C^6$, form shoulders $C^7$, over which the outer inwardly curved edge portions D' of the flanges project to assist in holding the tire to the wheel felly. The portions $C^8$ extend around and below band B where they are increased in thickness, and abut the sides of the felly as shown. The side clamps extend over the portions $C^8$ and abut the felly and are held thereto by bolt and nut construction illustrated at E. The walls contact the periphery of the band adjacent to its edges and curve with gradual convex curves $C^{13}$ up to their abutting line of contact $C^5$. With this construction, the initial stress on the tread tends to bend the rubber and cause it to seat farther upon the band. Added stress upon the tread will cause a compression of the rubber or elastic material and thus giving rise to a greater resistance than that offered to the initial stress.

The non-skid tread surface is illustrated at F in Fig. 3. The length of contact of the abutting surfaces $C^5$ in Fig. 3 are shown as greater than in Fig. 2, and illustrates one way of making a stiffer construction than that shown in Fig. 2, as will be readily understood.

The differences between the construction just described and that shown in Fig. 6 is, that the outer surface of the side walls is not curved inward as illustrated at $C^6$ in Fig. 2, but presents straight parallel sides, and the side clamps are formed without the curved portions $D'$. The space $C'$ is of greater area than space $C^{10}$, and the under side $C^{12}$ of the curved wall is formed lower and of less radius than that of the wall $C^{13}$, thus making a stiffer construction than that shown in Fig. 2, and more suitable for carrying a heavy load where the width of the tires are the same. The walls are noticeably thicker in the construction shown in Fig. 6 than as shown in Fig. 2, and this also would add strength and stiffness to the tire.

Referring now to Figs. 4 and 5, it will be seen that the tire disclosed in Fig. 2 as shown down to the dotted lines Z—Z, is inclosed in a shoe G, the inner edges of said shoe being formed in the same shape as the inner edge portions $C^8$ of the tire shown in Fig. 2, and thus holding the inner tire portion securely in place. By this construction, the shoe may be worn out and replaced with a new one and the inner portion used again. By using the conformation of elastic walls described in connection with Figs. 1 to 3, a similar action is obtained in resisting stress upon the tread, as above described.

In Fig. 5, I illustrate the inner portion H as formed with a double tread or divided tread indicated by $H'$ and $H^2$, and by reason of their being joined together or abutting on the dotted line X—X, as may be preferred, a central inner bearing $H^3$ is provided and a middle bearing or abutting surface $H^4$ is also provided, the effect of which is to form coöperative support laterally. A shoe $G'$, similar in construction to shoe G in Fig. 4, is provided to hold the inner portions in proper position. The thickness of the walls of the portion H are practically uniform but may be modified in this respect without departing from the scope of my invention.

It will be obvious to those skilled in this art that my invention resides primarily in the shape of the inner sides of the walls of the tire so formed as to present an annular space or spaces extending circumferentially of the tire as illustrated and having one or more abutting surfaces which form the partition or partitions between said chambers or spaces, and next, in forming the exterior surfaces so that pressure against the tread will be transmitted to the abutting surfaces, which surfaces are more or less curved.

Referring now to the constructions shown in Figs. 7 and 8; Fig. 7 is the same construction as that shown and described in Fig. 6, except the outer annular chamber $C^2$ is dispensed with, but the tire section is divided or parted up to about the same point $C^{14}$ in the tire, thereby providing a longer abutting surface between the side portions.

In the construction disclosed in Fig. 8, the outer chamber is dispensed with and the tire divided up to the point $C^{14}$ thus providing tire sections of about equal thickness. The tire is also provided with an inner band I, located at the bottom of the annular chamber $C^{10}$, and the inner edge portions J and $J'$ are united together along the dotted line $J^2$, beneath the band I and therefore the tire as a whole is mounted outside of the periphery of the felly A and held by the side clamps D in position on the wheel.

Fig. 9 is practically the same construction disclosed in Fig. 5 except that the chambers $C^2$ are eliminated and the tire divided up to a point $C^{14}$, thus providing a stiffer construction than that shown in Fig. 5.

These features of construction I believe to be broadly new and commercially valuable.

Having thus described my invention, I claim as new:—

1. A tire comprising an elastic tread having a plurality of substantially solid walls adapted to rest upon the felly of the wheel adjacent to the peripheral edges thereof, said walls contacting each other along an intermediate circumferential line and curving convexly and gradually from said points of contact with the felly to said intermediate circumferential line of contact, and adapted to gradually seat upon the felly to offer a gradually increasing resistance to distortion when the pressure upon the tread is increased and flanges embracing the exterior of said walls from their inner circumference up to points in substantial alinement with said circumferential line of contact.

2. A tire including two substantially solid, resilient walls united at their periphery and formed at their interior side with portions adapted to contact, at two spaced circumferential lines the periphery of a circular band member, said walls contacting each other along a circumferential line intermediate said interior contacting portions and converging gradually from said interior contacting portions to said intermediate circumferential line of contact; the converging portions of the walls being adapted to gradually seat upon said member as the pressure upon the tread surface of the tire is increased; said circumferential line of contact moving relatively to said walls while the latter seat upon said member.

3. An elastic tire, comprising a tread and integral solid side walls adapted to rest on the felly of the wheel on which the tire is to be used, the inner faces of the said side walls contacting each other along an intermediate circumferential line and extending gradually inward and sidewise from said intermediate line of contact to form a circumferential chamber directly opposite the tread to offer a continually increasing resistance to distortion when the pressure upon the said tread is increased.

Signed at New York city, in the county of New York and State of New York this 5th day of March A. D. 1912.

JÖNS MONSON.

Witnesses:
 FRANK M. ASHLEY,
 GEORGE DOAN RUSSELL.